United States Patent
Boland

(10) Patent No.: US 11,453,369 B2
(45) Date of Patent: Sep. 27, 2022

(54) WINDSCREEN WIPER DEVICE

(71) Applicant: TRICO BELGIUM SA, Aubange (BE)

(72) Inventor: Xavier Boland, Arlon (BE)

(73) Assignee: Trico Belgium SA, Aubange (BE)

(*) Notice: Subject to any disclaimer, the term of this patent is extended or adjusted under 35 U.S.C. 154(b) by 51 days.

(21) Appl. No.: 16/492,384

(22) PCT Filed: Mar. 8, 2017

(86) PCT No.: PCT/EP2017/055444
§ 371 (c)(1),
(2) Date: Sep. 9, 2019

(87) PCT Pub. No.: WO2018/162056
PCT Pub. Date: Sep. 13, 2018

(65) Prior Publication Data
US 2020/0039474 A1 Feb. 6, 2020

(51) Int. Cl.
B60S 1/40 (2006.01)

(52) U.S. Cl.
CPC ..... B60S 1/4048 (2013.01); B60S 2001/4051 (2013.01)

(58) Field of Classification Search
CPC .................. B60S 1/4048; B60S 2001/4051
See application file for complete search history.

(56) References Cited

U.S. PATENT DOCUMENTS

2013/0111691 A1* 5/2013 Ozer ............... B60S 1/3868
15/250.31
2014/0259505 A1 9/2014 Fournier et al.

FOREIGN PATENT DOCUMENTS

DE 102016111655 12/2016
WO 2010142339 12/2010

* cited by examiner

Primary Examiner — Andrew A Horton
(74) Attorney, Agent, or Firm — Bryan Cave Leighton Paisner LLP

(57) ABSTRACT

A windscreen wiper device is provided comprising an elastic, elongated carrier element, and an elongated wiper blade of a flexible material. The wiper blade includes at least one longitudinal groove, in which a longitudinal strip of the carrier element is disposed. The windscreen wiper device comprises a connecting device for an oscillating arm that can be pivotally connected to the connecting device, about a pivot axis near one end, with the interposition of a joint part. The joint part is locked onto said oscillating arm and at least one laterally inwardly extending protrusion provided on the oscillating arm is snapped behind a wall of the joint part. The joint part is unlocked from the oscillating arm. The wall of the joint part is allowed to bend laterally inwardly in order to release the protrusion of the oscillating arm from the wall.

14 Claims, 6 Drawing Sheets

Mounting

Mounting

Dismounting

WINDSCREEN WIPER DEVICE

BACKGROUND OF THE INVENTION

A windscreen wiper device of the flat blade type is generally known. In such a windscreen wiper device of the flat blade type no use is made of several yokes pivotally connected to each other, but wherein the wiper blade is biased by the carrier element, as a result of which it exhibits a specific curvature. In practice, due to high forces exerted on the connection between the connecting device and the oscillating arm, the reliability of said connection appears to diminish in time. Therefore, there is a need to improve said connection on the one hand, but to ensure an easy disconnection on the other hand, particularly in case of repair or replacement of said wiper blade.

The object of the invention is to provide an improved windscreen wiper device of the flat blade type.

SUMMARY OF THE INVENTION

The present invention relates to a windscreen wiper device of the flat blade type comprising an elastic, elongated carrier element, as well as an elongated wiper blade of a flexible material, which can be placed in abutment with a windscreen to be wiped, which wiper blade includes at least one longitudinal groove, in which groove a longitudinal strip of the carrier element is disposed, which windscreen wiper device comprises a connecting device for an oscillating arm, wherein the oscillating arm can be pivotally connected to the connecting device about a pivot axis near one end, with the interposition of a joint part, wherein the connecting device and the joint part are provided with mutually cooperating pivot means for pivotally connecting the joint part to the connecting device.

In the framework of the present invention the following is noted. The connecting device, also called "connector", is preferably made of plastic. The connector is preferably made in one piece, also called a "one piece connector". Also the joint part, also called "adapter", is preferably made of plastic. The joint part acts as an adapter interposed between the connecting device and the oscillating arm. The wiper blade being preferably made of an elastomer material, such as rubber, is particularly made through extrusion. Particularly, the wiper blade comprises a spoiler at a side thereof facing away from the windscreen to be wiped, wherein the wiper blade and the spoiler are preferably made in one piece. The longitudinal groove is preferably a central longitudinal groove accommodating said longitudinal strip. The longitudinal strip is also called a "flexor". The connecting device acts is preferably fixedly connected to the longitudinal strip(s) particularly through a welding, brazing ("soldering"), gluing or clamping operation or with the help of a pin inserted through the connecting device and the longitudinal strip(s). In the alternative or in addition thereto, the connecting device is clamped onto the flexible material of the wiper blade, particularly in case the latter is equipped with a central longitudinal groove for the carrier element. All the above preferred features of the present invention can be used alone or in combination with any other feature(s), as a skilled person would appreciate.

In order to accomplish that objective, a windscreen wiper device of the type referred to in the background is characterized according to the invention in that the joint part can be pivoted between a wiping position and a service position. In the wiping position the joint part is locked onto the oscillating arm, and wherein at least one laterally inwardly extending protrusion provided on said oscillating arm is snapped behind a wall of the joint part. In the service position the joint part is unlocked from the oscillating arm, and wherein the wall of the joint part is allowed to bend laterally inwardly in to release said protrusion of the oscillating arm from said wall of the joint part. In other words, in the wiping position, the wiper blade is able to carry out its oscillatory movement on a windscreen to be wiped, the oscillating arm and the unit consisting of the joint part, the connecting device and the wiper blade, are firmly interconnected, and the laterally inwardly extending protrusion and the wall of the joint part are interconnected through a snapping operation.

The wall of the joint part is plastically or elastically deformed during this operation. However, in the service position, the oscillating arm is in an upright position relative to a windscreen to be wiped, the unit consisting of the joint part, the connecting device and the wiper blade can easily disconnected for repair of replacement.

It is noted that the present invention is not restricted to cars, but also refers to rail coaches and other (fast) vehicles.

It is noted that the present invention is not restricted to the use of only one longitudinal strip forming the elastic carrier element that is particularly located in a central longitudinal groove of the wiper blade. Instead, said carrier element may also comprise two longitudinal strips, such that the strips are disposed in opposite longitudinal grooves of the wiper blade. The groove(s) may be closed at one outer end.

Further, it is noted that in the invention use is made of a mounting head fixed for rotation to a shaft. The shaft is rotatable alternately in a clockwise and in a counter-clockwise sense carrying the mounting head into rotation. Thus, in turn said mounting head draws the connecting device into rotation and thereby moves said wiper blade. In the alternative, the mounting head is fixed for translation to a carriage. The carriage can be translated alternately in a one linear direction and in another counter linear direction carrying said mounting head into translation. The present invention can therefore be used for circular or linear movement of the mounting head.

Preferably, the joint part comprises at least one tab to be activated by hand to allow the wall of the joint part to bend laterally inwardly in the service position in order to release said protrusion of the oscillating arm from the wall of the joint part. Particularly, the tab is formed by an extension, preferably in longitudinal direction, of the wall of the joint part. In the alternative, the tab is particularly formed by a protrusion extending laterally outwardly from the wall of the joint part.

In order to ensure the wiping position of the oscillating arm and the unit consisting of the joint part, the connecting device and the wiper blade cannot be disconnected, for safety reasons, the tab is blocked against bending laterally inwardly by a part of the connecting device extending upwardly.

The connecting device and joint part are preferably detachably interconnected by snapping, that is clipping said joint part onto said connecting device.

In one preferred embodiment of a windscreen wiper device in accordance with the invention the oscillating arm has an at least substantially U-shaped cross-section at the location of its connection to the joint part, such that each leg of said U-shaped cross-section comprises a laterally inwardly extending protrusion snapping behind a corresponding wall of the joint part in the wiping position. The protrusions are preferably in one piece with the oscillating arm and extend laterally inwardly from free edges of the legs of the U-shaped cross-section of the oscillating arm.

In another preferred embodiment of a windscreen wiper device according to the invention the protrusions are located opposite each other and are facing towards said free end of the oscillating arm.

In another preferred embodiment of a windscreen wiper device in accordance with the invention the joint part has an at least substantially U-shaped cross-section at the location of its connection to the connecting device, wherein each leg of the U-shaped cross-section of the joint part is facing towards a corresponding leg of the U-shaped cross-section of the oscillating arm. In this case the laterally inwardly extending protrusions on the oscillating arm in the wiping position snap behind the legs of the U-shaped cross-section of the joint part, the legs each form a wall of the joint part in the framework. Particularly, the joint part is located inside the oscillating arm at the location of their interconnection. More preferably, the joint part is entirely received inside the oscillating arm.

In another preferred embodiment of a windscreen wiper device according to the invention the oscillating arm comprises a pair of opposite, laterally inwardly extending protrusions on the legs of the U-shaped cross-section thereof. The protrusions of the pair are facing away from the free end of the oscillating arm. Preferably, the protrusions of the pair are hooking behind a corresponding leg of the U-shaped cross-section of the joint part for blocking a longitudinal movement of the wiper blade with respect to the oscillating arm.

In another preferred embodiment of a windscreen wiper device in accordance with the invention the joint part is connected to the connecting device by pivotally engaging protuberances of the connecting device, at the location of the pivot axis, in recesses provided in the joint part, and wherein the oscillating arm can be subsequently connected to the joint part. Particularly, the joint part in each leg of its U-shaped cross-section is provided with a recess provided coaxially with the pivot axis.

In another preferred embodiment of a windscreen wiper device according to the invention the protuberances of the connecting device extend outwards on either side of the connecting device. The protuberances are at least substantially cylindrical.

BRIEF DESCRIPTION OF THE DRAWINGS

The invention will now be explained in more detail with reference to figures illustrated in a drawing, wherein.

DETAILED DESCRIPTION OF THE PREFERRED EMBODIMENTS

Figure 1:
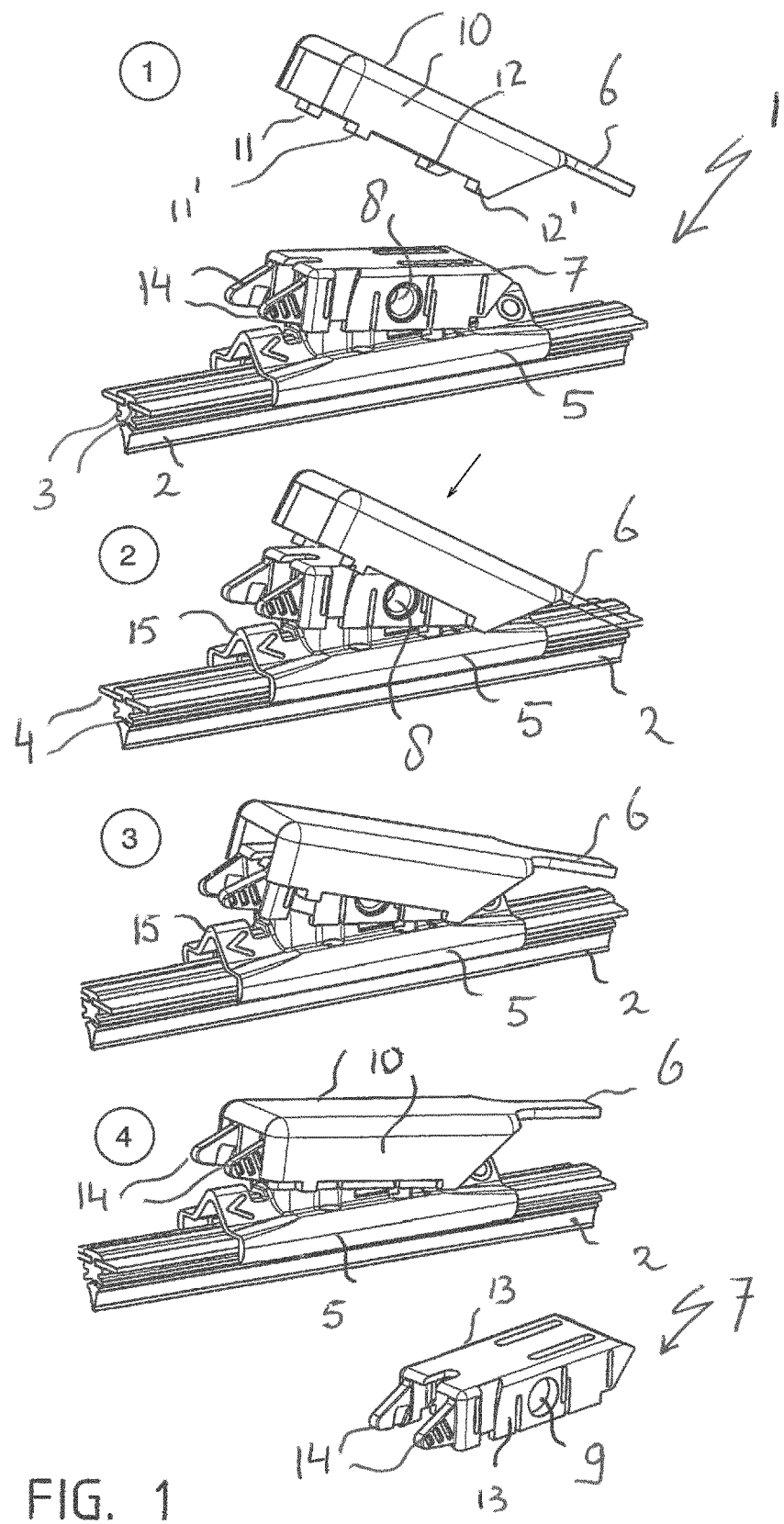
FIG. 1 is a perspective, schematic view of a windscreen wiper device of the flat blade type according to a first embodiment of the invention.

With reference to all figures, a flat blade type of a windscreen wiper device 1 according to the invention is shown. The windscreen wiper device 1 is built up of an elastomeric wiper blade 2 comprising—at its longitudinal sides—opposing longitudinal grooves 3. Longitudinal strips 4 made of spring band steel, are fitted in the longitudinal grooves 3. The strips 4 form a flexible carrier element for the wiper blade 2, as it were, which is thus biased in a curved position (the curvature in operative position being that of a windscreen to be wiped). Ends of the strips 4 and/or wiper blade 2 may be connected on either side of the windscreen wiper device 1 to a connecting piece or "end cap" functioning as clamping members (not shown). The connecting pieces could be separate constructional elements, which may be form-locked ("positive locking" or "having a positive fit") or force-locked to the ends of the strip 4 and/or wiper blade 2. In another preferred embodiment, the connecting pieces are in one piece with the strips 4 made of spring band steel.

The windscreen wiper device 1 is furthermore built up of a connecting device 5 of plastic material according to a preferred embodiment for an oscillating arm 6. Alternatively, the connecting device 5 may also be made of metal, such as steel or aluminum. The connecting device 5 is preferably fixedly connected to the longitudinal strips 4 through a welding, brazing ("soldering"), gluing or clamping operation. In the alternative or in addition thereto, connecting device 5 is clamped onto the flexible material of the wiper blade 2, particularly in case the wiper blade is equipped with a central longitudinal groove 3 for the carrier element. A joint part 7 is interposed between the connecting device 5 and the oscillating arm 6. As depicted, the connecting device 5 comprises two cylindrical protuberances 8 extending outwardly on either side of the connecting device 5, wherein the protuberances 8 pivotally engage into correspondingly shaped recesses 9 of the joint part 7.

Figure 2:
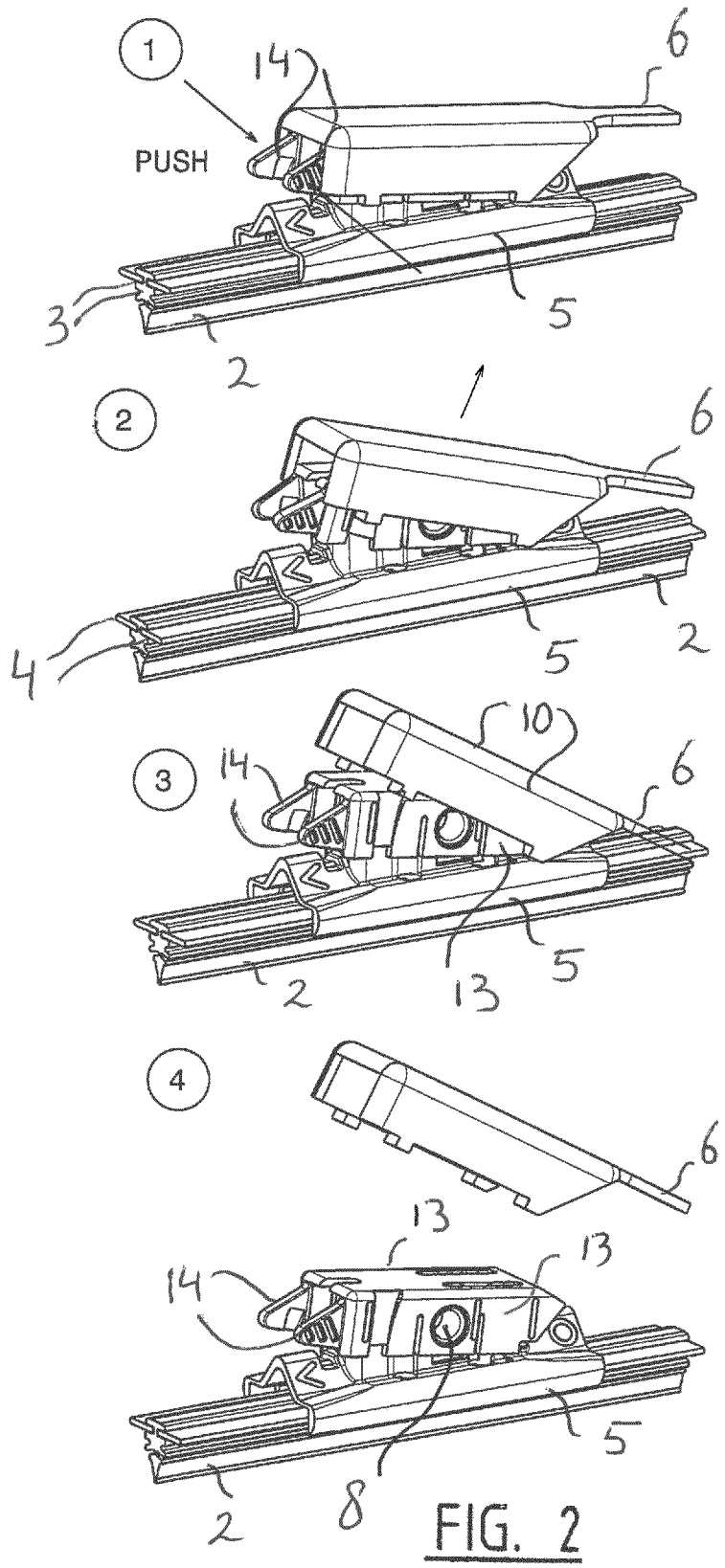
FIG. 2 is another perspective, schematic view of the windscreen wiper device of FIG. 1.
Figure 3:
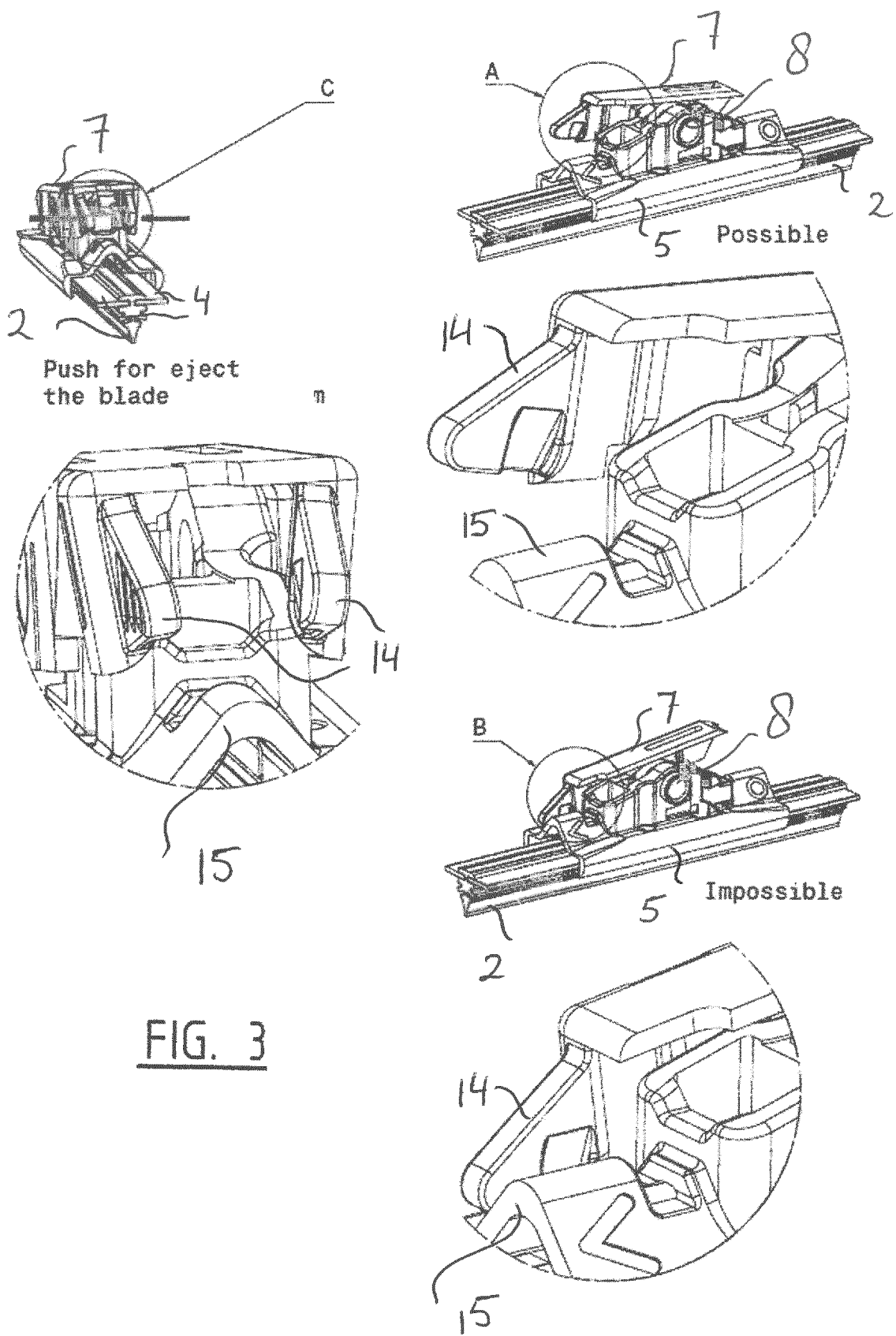
FIG. 3 is a magnified view of elements of both FIGS. 1 and 2.

The connecting device 5 is pivotally connected to or disconnected from the oscillating arm 6 about a pivot axis near one end, as will be described hereunder, on the basis of two preferred embodiments: FIGS. 1 through 3 relating to a first preferred embodiment and FIGS. 4 through 6 relating to a second preferred embodiment according to the invention. As can be seen in both embodiments, the oscillating arm 6 has a U-shaped cross-section at the location of its connection to the joint part 7, wherein legs 10 of the U-shaped cross-section comprise two pairs of laterally inwardly extending protrusion 11,11' and 12,12', all in one piece with the oscillating arm 6 and extending laterally inwardly from free edges of the legs 10 of the U-shaped cross-section of the oscillating arm 6. Also, the joint part 7 has a U-shaped cross-section at the location of its connection to the connecting device 5, wherein each leg 13 of the U-shaped cross-section of the joint part 7 is facing towards a corresponding leg 10 of the U-shaped cross-section of the oscillating arm 6.

FIG. 1 shows stepwise in steps 1 through 4 how a unit consisting of the wiper blade 1, the connecting device 5 connected to the longitudinal strips 4 and the joint part 7 pivotally connected to the connecting device 5 is mounted onto the oscillating arm 6. First, the joint part 7 is put on the oscillating arm 6 with its protrusions 12,12' facing away from its free end hooking behind the legs 13 of the U-shaped cross-section of said joint part 7. Further, the joint part 7 is pivoted upwardly relative to the oscillating arm 6 until its protrusions 11,11' facing towards its free end snap behind the legs 13 of the U-shaped cross-section of the joint part 7, thereby locally elastically deforming said legs 13. The joint part 7 is then located inside the oscillating arm 6 at the location of their interconnection. FIG. 2 shows stepwise in steps 1 through 4 how a unit consisting of the wiper blade 1, the connecting device 5 connected to the longitudinal strips 4 and the joint part 7 pivotally connected to the connecting device 5 is dismounted from the oscillating arm 6. As shown in FIGS. 1 and 2, the joint part 7 comprises two tabs 14 each formed by a longitudinal extension of a leg 13 of the U-shaped cross-section of the joint part 7. These tabs 14 can be pushed in by hand in a direction laterally inwardly to allow the legs 13 of the U-shaped cross-section of the joint part 7 to bend laterally inwardly in the service position in order to release the protrusion 11,11' of the oscillating arm 6 from the legs 13 of the U-shaped cross-section of the joint part 7.

Figure 4:
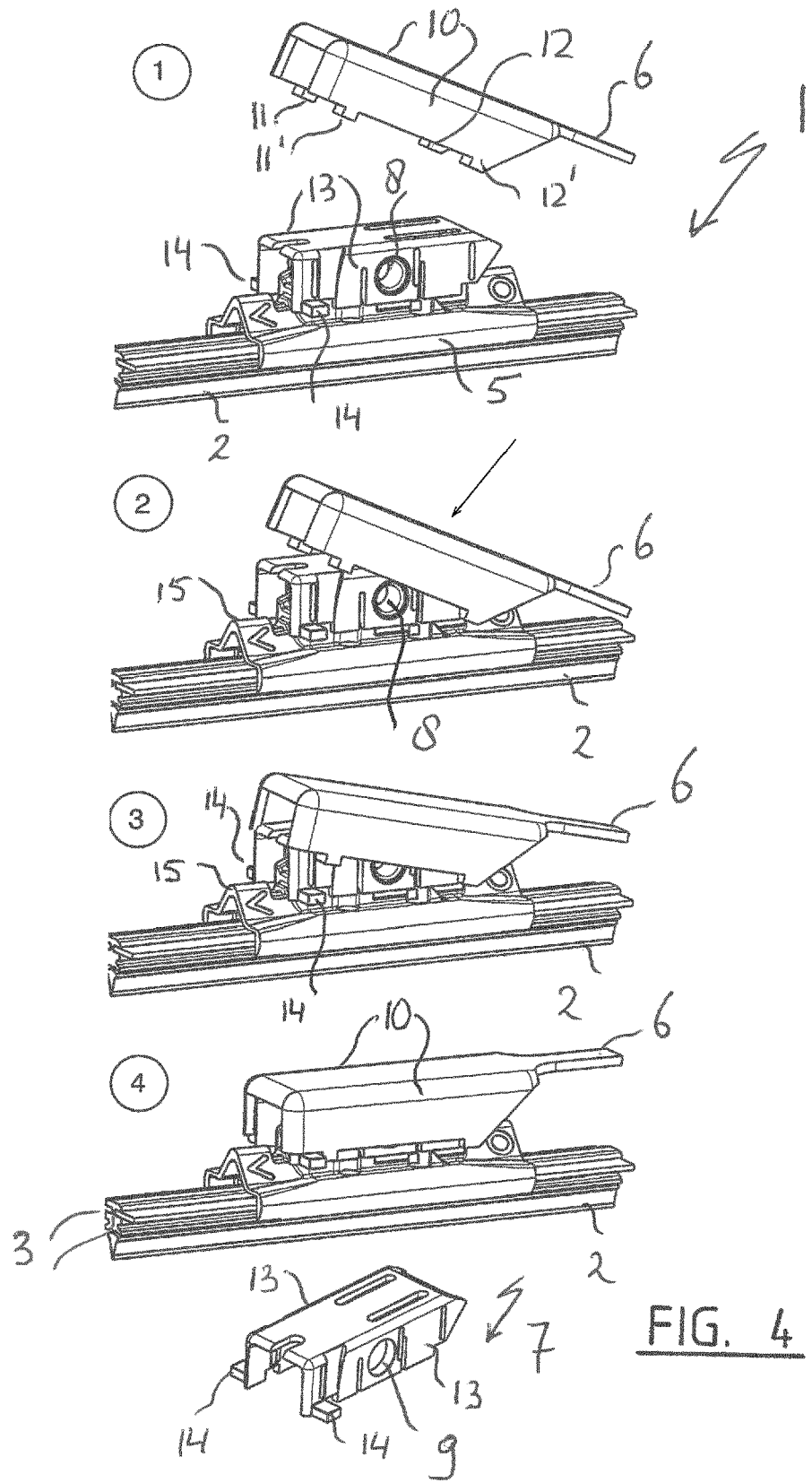
FIG. 4 is a perspective, schematic view of a windscreen wiper device of a flat blade type according to a second embodiment of the invention.
Figure 5:
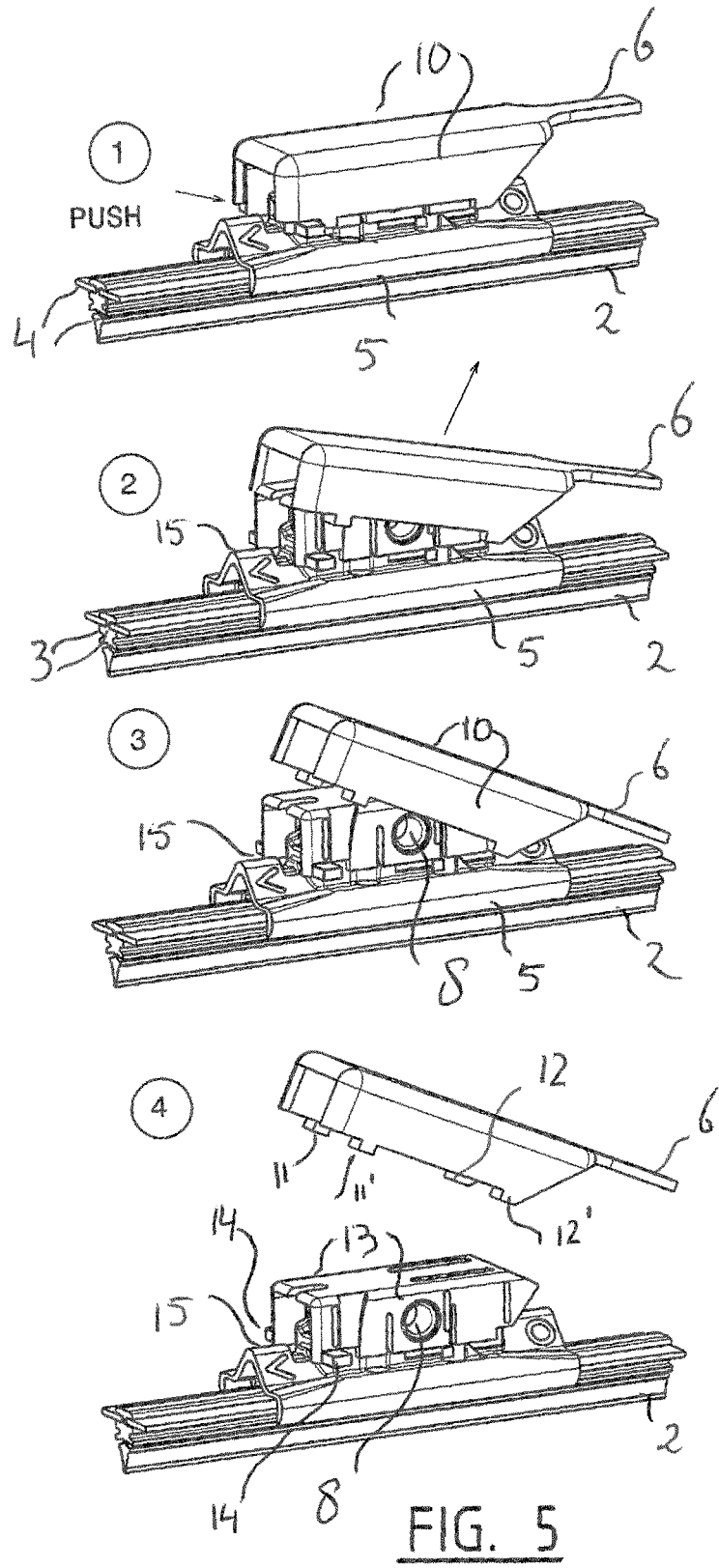
FIG. 5 is a perspective, schematic view of a windscreen wiper device of a flat blade type according to a second embodiment of the invention.
Figure 6:
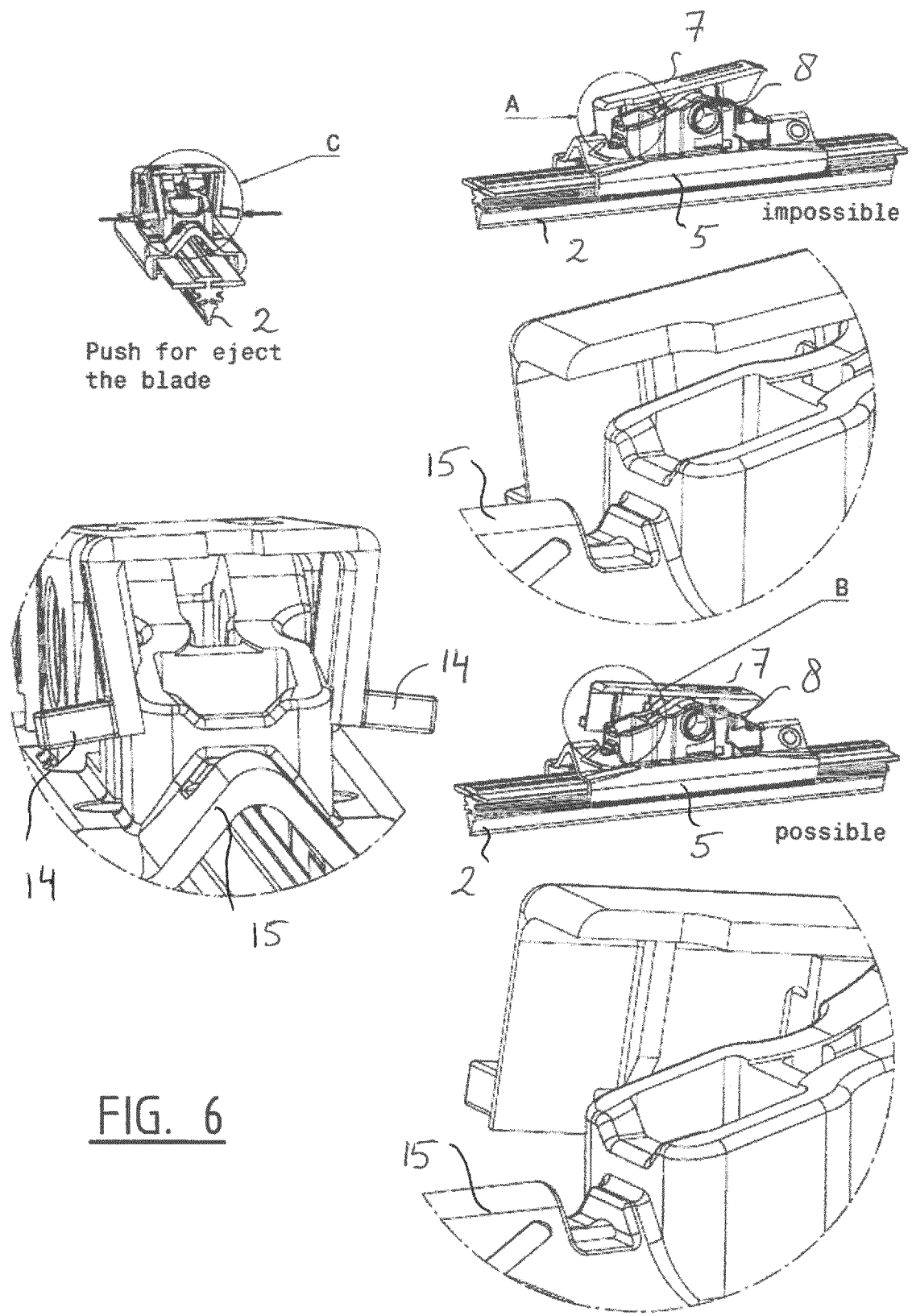
FIG. 6 is a magnified view of elements of both FIGS. 4 and 5.

FIGS. 4 and 5 correspond to FIGS. 1 and 2, with the difference that in the second preferred embodiment of FIGS. 4 and 5 the tabs 14 are formed by protrusions extending laterally outwardly from the legs 13 of the U-shaped cross-section of said joint part 7. In order to ensure that the wiping position of the oscillating arm 6 and the unit consisting of the joint part 7, the connecting device 5 and the wiper blade 2 cannot be disconnected. For safety reasons said tabs 14 are blocked against bending laterally inwardly by a part 15 of the connecting device 5 extending upwardly. This applies to both preferred embodiments, wherein reference is made to FIGS. 3 and 6.

The invention is not restricted to the variants shown in the drawing, but it also extends to other embodiments that fall within the scope of the appended claims.

The invention claimed is:

1. A windscreen wiper device comprising an elastic, elongated carrier element, as well as an elongated wiper blade of a flexible material, which can be placed in abutment with a windscreen to be wiped, which wiper blade includes at least one longitudinal groove, in which groove a longitudinal strip of the carrier element is disposed, which windscreen wiper device comprises a connecting device for an oscillating arm, wherein said oscillating arm can be pivotally connected to said connecting device about a pivot axis near one end with the interposition of a joint part, wherein said joint part comprises a pair of walls and a pair of tabs that extend from an end of the pair of walls and said joint part is adapted to be locked onto said oscillating arm, wherein at least one laterally inwardly extending protrusion provided on said oscillating arm is snapped behind at least one of the pair of walls of said joint part, wherein while said joint part is locked onto said oscillating arm, said joint part is pivotable relative to said connecting device between a wiping position and a service position, wherein:

when in the wiping position, a part of said connecting device extends upwardly between the pair of tabs of said joint part, and said pair of tabs is blocked against bending laterally inwardly by the part of said connecting device extending upwardly; and when in the service position, said joint part pivots about the connecting device to position the pair of tabs away from said part of said connecting device that extends upwardly, and the pair of tabs is bendable inwardly to allow said pair of walls of said joint part to bend laterally inwardly to release said protrusion of said oscillating arm from said at least one of the pair of walls of said joint part.

2. The windscreen wiper device according to claim 1, wherein said pair of tabs is formed by extension of said pair of walls of said joint part.

3. The windscreen wiper device according to claim 1, wherein said pair of tabs extends laterally outwardly from said pair of walls of said joint part.

4. The windscreen wiper device according to claim 1, wherein said oscillating arm has an at least substantially U-shaped cross-section at the location of its connection to said joint part, and wherein each leg of said U-shaped cross-section comprises a laterally inwardly extending protrusion snapping behind a corresponding one of the pair of walls of said joint part in said wiping position.

5. The windscreen wiper device according to claim 4, wherein said protrusions are located opposite each other and are facing towards said free end of said oscillating arm.

6. The windscreen wiper device according to claim 4, wherein said joint part has an at least substantially U-shaped cross-section at the location of its connection to said connecting device, and wherein each leg of said U-shaped cross-section of said joint part is facing towards a corresponding leg of said U-shaped cross-section of said oscillating arm.

7. The windscreen wiper device according to claim 6, wherein said oscillating arm comprises a pair of opposite, laterally inwardly extending protrusions on the legs of the U-shaped cross-section thereof, and wherein said protrusions of said pair are facing away from said free end of said oscillating arm.

8. The windscreen wiper device according to claim 7, wherein said pair of protrusions are hooked behind a corresponding leg of the U-shaped cross-section of the joint part for blocking a longitudinal movement of said wiper blade with respect to said oscillating arm.

9. The windscreen wiper device according to claim 6, wherein said joint part is connected to said connecting device by pivotally engaging protuberances of said connecting device at the location of said pivot axis, in recesses provided in said joint part.

10. The windscreen wiper device according to claim 9, wherein said joint part has a recess provided coaxially with said pivot axis in each leg of said U-shaped cross-section.

11. The windscreen wiper device according to claim 9, wherein the protuberances of said connecting device extend outwards on either side of said connecting device.

12. The windscreen wiper device according to claim 9, wherein the protuberances are substantially cylindrical.

13. The windscreen wiper device according to claim 4, wherein said joint part is located inside said oscillating arm at the location of their interconnection.

14. The windscreen wiper device according to claim 1, wherein said joint part is detachably connected to said connecting device through a snapping operation.

* * * * *